United States Patent
Lee et al.

(10) Patent No.: US 7,224,406 B2
(45) Date of Patent: May 29, 2007

(54) DIGITAL SIGNAL PROCESSING SYSTEM AND METHOD APPLIED FOR CHROMA TRANSITION

(75) Inventors: Ming-Hsiu Lee, Hsinchu (TW); Yuan-Hao Huang, Hsinchu (TW)

(73) Assignee: VXIS Technology Corp., Hsinchu (TW)

( * ) Notice: Subject to any disclaimer, the term of this patent is extended or adjusted under 35 U.S.C. 154(b) by 465 days.

(21) Appl. No.: 10/919,559

(22) Filed: Aug. 16, 2004

(65) Prior Publication Data

US 2005/0122431 A1    Jun. 9, 2005

(30) Foreign Application Priority Data

Dec. 8, 2003    (TW) .............................. 92134545 A (51) Int. Cl.
*H04N 5/21* (2006.01)
*H04H 9/64* (2006.01)

(52) U.S. Cl. .................. 348/630; 348/713; 348/708

(58) Field of Classification Search ............... 348/630, 348/631, 571, 708, 705, 706, 713, 624; *H04N 5/21, H04N 9/64*
See application file for complete search history.

(56) References Cited

U.S. PATENT DOCUMENTS

| | | | | |
|---|---|---|---|---|
| 5,416,531 A * | 5/1995 | Gai | ............................ | 348/663 |
| 5,920,357 A * | 7/1999 | Ohara | ......................... | 348/630 |
| 5,936,682 A * | 8/1999 | Thomas et al. | ............. | 348/631 |
| 6,008,862 A * | 12/1999 | Bellers | ........................ | 348/631 |
| 6,571,224 B1 * | 5/2003 | He et al. | ......................... | 706/8 |

* cited by examiner

*Primary Examiner*—Sherrie Hsia
(74) *Attorney, Agent, or Firm*—Alan Kamrath; Kamrath & Associates PA (57) ABSTRACT

A digital signal processing system and method applied for chroma transition, wherein the method has the acts of: performing a difference process on an original chroma signal C to obtain a first difference signal C'; calculating an absolute value |C'| of the first difference signal C'; performing a difference process on the absolute value |C'| to obtain a second difference signal Ca'; determining whether the second difference signal Ca' is a positive signal or a negative signal; wherein based on a determined result, an optimized chroma signal is generated by either mixing the original input chroma signal C with a k-delayed chroma signal, or mixing the k-delayed chroma signal C[n–k] with a 2k-delayed chroma signal C[n–2k], where k is a constant.

14 Claims, 8 Drawing Sheets

FIG. 10
PRIOR ART understand# DIGITAL SIGNAL PROCESSING SYSTEM AND METHOD APPLIED FOR CHROMA TRANSITION

BACKGROUND OF THE INVENTION

1. Field of the Invention

The present invention relates to a digital signal processing system and method applied for chroma transition, and more particularly to a system that selectively mixes previous, present and delayed chroma signals to generate an optimized chroma signal to improve color sharpness in a television.

2. Description of Related Art

In usual video signal (NTSC or PAL standard) processing, a video signal is separated into picture information and non-picture information. A chrominance (chroma) signal and a luminance signal which comprise the picture information are then subsequently extracted. Based on the chroma signal, two orthogonal factors can be further derived from the chroma signal. The chroma signal together with the two orthogonal factors are usually referred to as Y, U, V signals (or Y, I, Q signals or Y, Cb, Cr signals). The chroma signal is carried over the luminance signal, wherein the phase of the chroma signal can represent a unique color. During chroma transition processes, the phase of the chroma signal will accordingly be changed. With the increase in the phase of the chroma signal, the time of the chroma transition will be extended, which detracts from color sharpness.

Picture signals including those of the NTSC, PAL and SECAM type all can be represented by combinations of the chroma and the luminance signal. The chroma signal bandwidth is narrow in comparison with the luminance signal bandwidth. Because of the limited frequency bandwidth of the chroma signal, chroma signal transitions (transients) are relatively slow. That is to say, the slope of a transition representing color edges has only a moderate slope, which when displayed for viewing detracts from sharp color demarcations.

Figure 6:
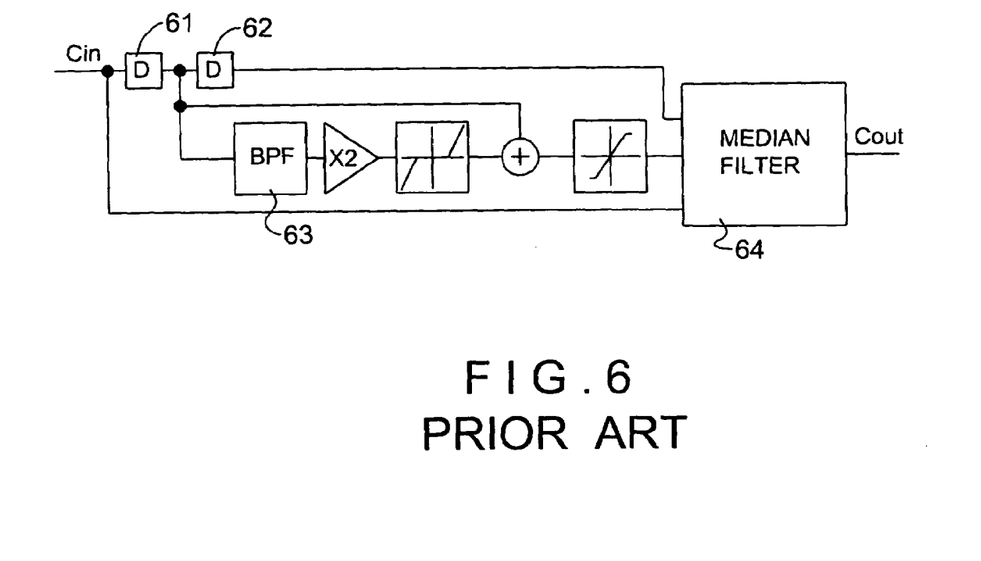
FIG. 6 is a circuit block diagram of a conventional circuit for color transient improvement of U.S. Pat. No. 5,920,357.
Figure 7:
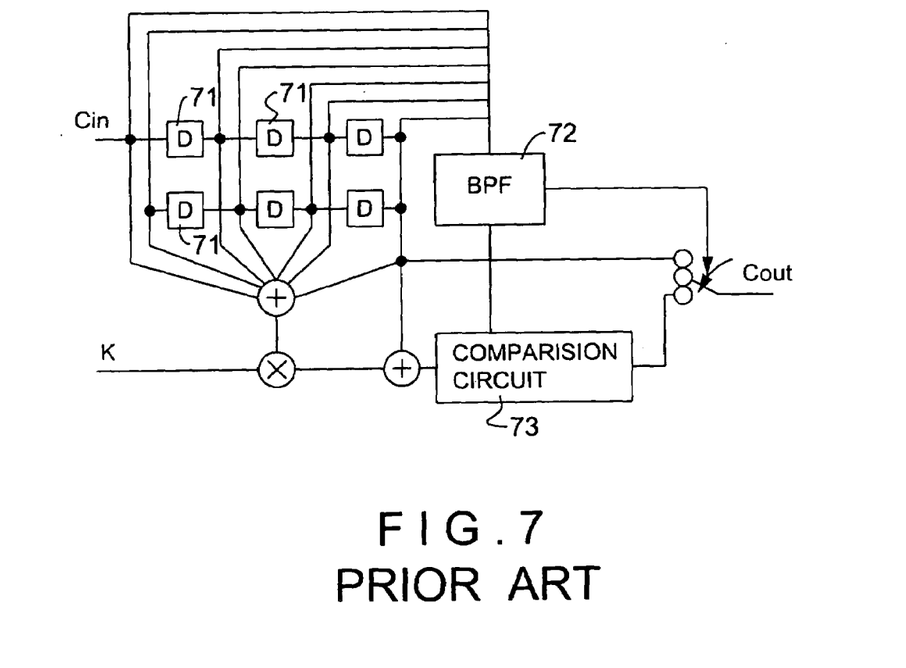
FIG. 7 is a circuit block diagram of a conventional circuit for color transient improvement of U.S. Pat. No. 5,936,682.

Some chroma transition approaches, which are directly performed on the chroma signal, have been proposed to improve the color sharpness. For example, with reference to FIG. 6, U.S. Pat. No. 5,920,357 issued to Ohara entitled "Digital color transient improvement" mainly uses two time delay circuits (61)(62), a band pass filter (63) and a median filter (64) to improve the chroma transition. With reference to FIG. 7, another similar approach is disclosed in U.S. Pat. No. 5,936,682 entitled "Circuit for enhancing chrominance transitions in real-time video reception" that utilizes multiple time delay circuits (71), a band pass filter 72 and a comparison circuit (73) to improve the chroma transition.

The two prior arts are indeed able to enhance the color sharpness. However the implementation of the digital filter is rather complex and expensive. Further, the output waveform of the median filter (64) is not ideal.

Figure 8:
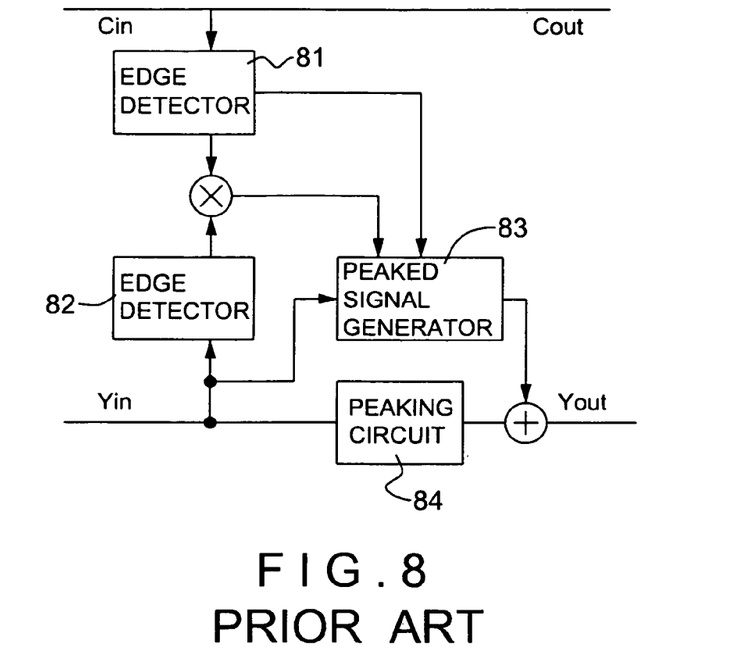
FIG. 8 is a circuit block diagram of a conventional circuit for color transient improvement of U.S. Pat. No. 6,008,862.

Another known technique is shown in FIG. 8, U.S. Pat. No. 6,008,862 entitled "Perceived color transient improvement", which adjusts the luminance signal based on the detected status of the chroma signal without directly modifying the chroma signal. The chroma signal (Cin) and the luminance signal (Yin) are respectively input to two edge detectors (81)(82). A multiplier (not numbered) multiplies the logical signals from the edge detectors (81)(82) and furnishes a logical control signal to an artificial peaked signal generator (83). Preferably, the edge detector (81) furnishes edge parameters like width and steepness of the edge to the artificial peaked signal generator (83). An output signal from the generator (83) is applied to an adder (not numbered), which also receives a peaked luminance signal from an optional luminance peaking circuit (84) to which the input luminance signal Yin is applied. The adder supplies the output luminance signal Yout. The output chroma signal (Cout) is identical to the input chroma signal (Cin).

Figure 9:
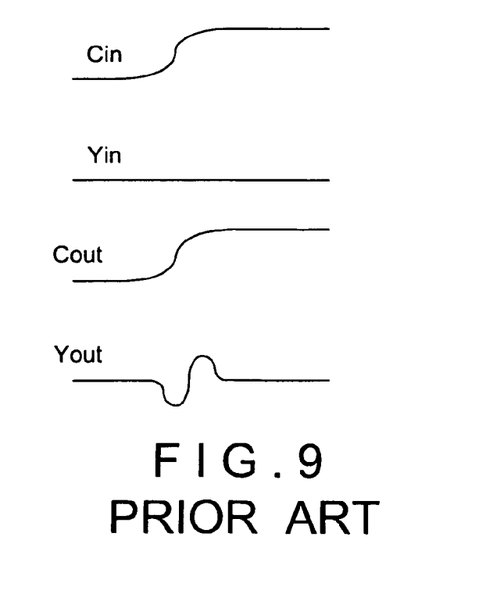
FIG. 9 illustrates waveforms of FIG. 8.

The architecture of FIG. 8 is mainly applied to the color display apparatus that receives video signals composed of three primary color signals, red, blue and green. The three primary color signals can be converted into Y, Cb and Cr signals through linear converting functions. Therefore, if the luminance signal has any change, the chroma signal is basically supposed to be affected. However, as shown in FIG. 9, the output chroma signal (Cout) is identical to the input chroma signal (Cin). That means there is no improvement in performance of the chroma signal.

Figure 10:
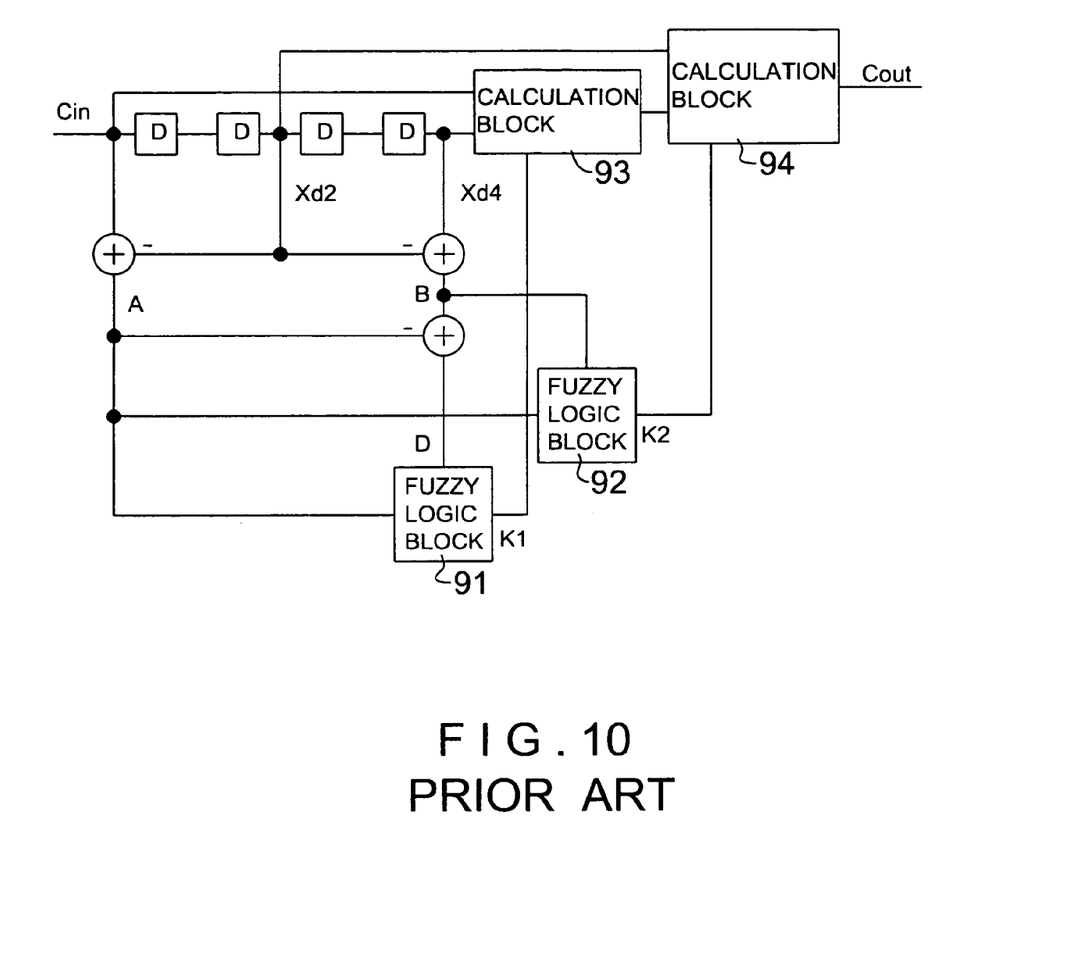
FIG. 10 is a circuit block diagram of a conventional circuit for color transient improvement of U.S. Pat. No. 6,008,862.

With reference to FIG. 10, U.S. Pat. No. 6,571,224 entitled "Fuzzy logic based color transition improvement method and system" adopts the fuzzy theory to optimize color transition. The system uses two parameter tables to control the color transition, wherein the first table is established based on first-order difference signals and second-order difference signals, and the second table is established based on the time when each of the first-order signals takes place. Even though the system does not need any filters, these fuzzy logic blocks (91)(92), calculation blocks (93) (94) and signal differential circuits are still complex.

SUMMARY OF THE INVENTION

The objective of the present invention is to provide a digital signal processing system and method applied for chroma transition, wherein the system selectively mixes previous, present and delayed chroma signals to generate an optimized chroma signal thus improving color sharpness.

Preferably, the system is performed by:

a first difference circuit, which receives an original chroma signal and generates a first difference signal of the original chroma signal;

a first absolute value circuit coupled to the first difference circuit to calculate an absolute value of the first difference signal;

a second difference circuit, which generates a second difference signal based on the reception of the absolute value from the first absolute value circuit;

a symbol determining circuit, which determines that the second difference signal is either a positive signal or a negative signal, wherein a determined result is used as a selecting signal;

a switching circuit, which receives the original chroma signal and a 2k-delayed chroma signal of the original chroma signal, wherein the switching circuit selectively outputs either the original chroma signal or the 2k-delayed chroma signal based on the selecting signal; and a signal calculation circuit, which receives an output signal of the switching circuit and a k-delayed chroma signal of the original chroma signal, and then generates therefrom an optimized chroma signal.

Other objects, advantages, and unique features of the invention will become more apparent from the following detailed description and accompanying drawings.

DETAILED DESCRIPTION OF THE PREFERRED EMBODIMENT

Figure 1:
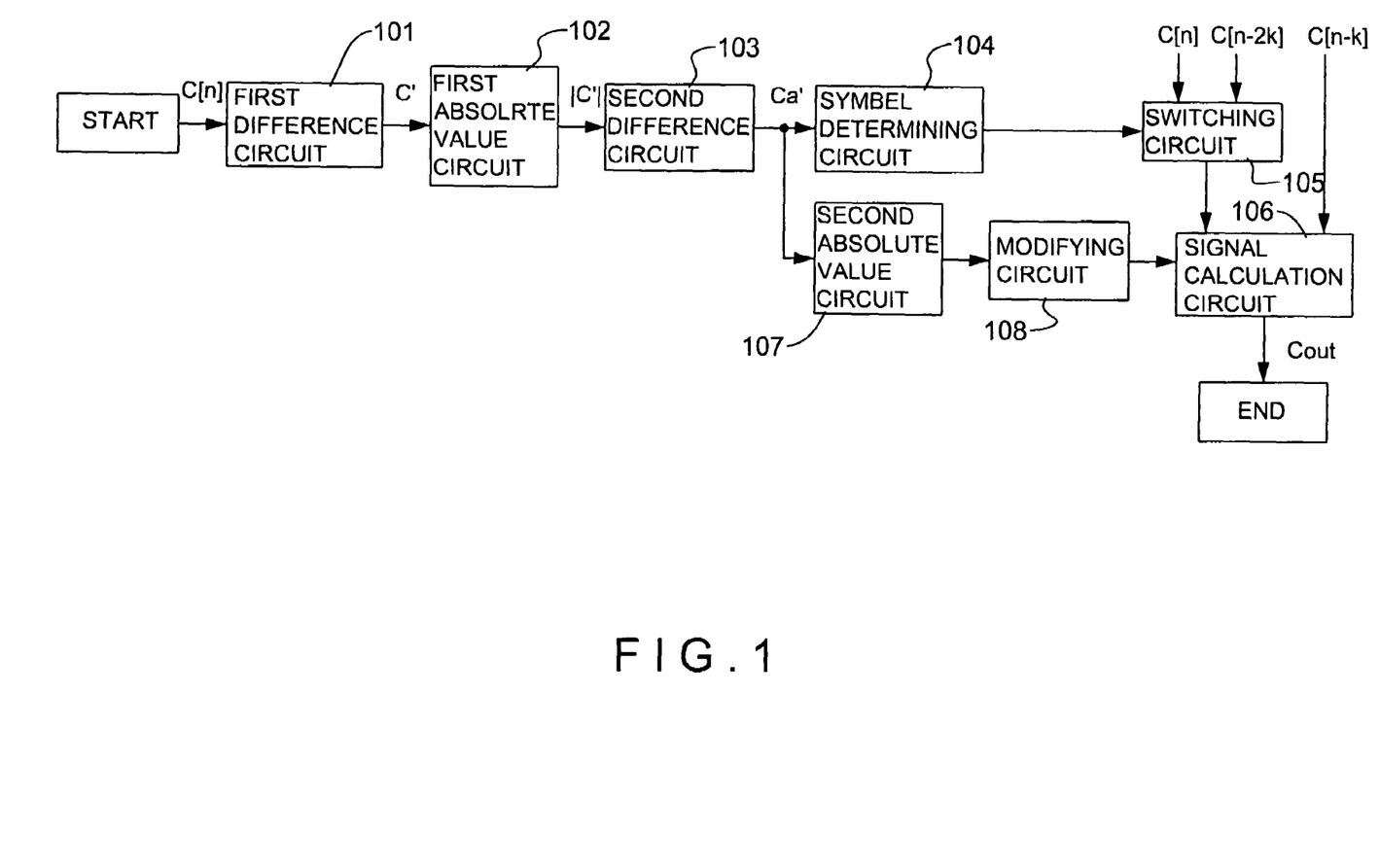
FIG. 1 is a block diagram of a digital chroma signal transition system in accordance with the present invention.

With reference to FIG. 1, a digital chroma signal transition system in accordance with the present invention comprises a first difference circuit (101), a first absolute value circuit (102), a second difference circuit (103), a symbol determining circuit (104), a switching circuit (105), a signal calculation circuit (106), a second absolute value circuit (107) and an optional modifying circuit (108).

The first difference circuit (101) generates a difference signal C' of first order based on an original input chroma signal C[n].

Upon reception of the first difference signal C', the first absolute value circuit (102) calculates an absolute value |C'| of the first difference signal C'.

When the second difference circuit (101) receives the absolute value |C'|, the second difference circuit (101) then generates a difference signal Ca' (or referred to as "delta" hereinafter) of a second order.

The difference signal of second order Ca' is then input to the symbol determining circuit (104). The symbol determining circuit (104) determines that the difference signal of second order Ca' is either a positive signal or a negative signal.

The switching circuit (105) simultaneously receives two signals, i.e. the original chroma signal C[n] and a 2k-delayed chroma signal C[n−2k] of the chroma signal C[n], where k is a constant. The output of the symbol determining circuit (104) is employed as a selecting signal furnished to the switching circuit (105). Therefore, based on the output of the symbol determining circuit (104), the switching circuit (105) selectively outputs either the original chroma signal C[n] or the 2k-delayed chroma signal C[n−2k].

The second absolute value circuit (107) receives the difference signal Ca' and calculates its absolute value |Ca'|. The absolute value |Ca'| is output to the signal calculation circuit (106) through the modifying circuit (108). The modifying circuit (108) can apply a proper weight factor on the absolute value |Ca'| before transmission to the signal calculation circuit (106).

The signal calculation circuit (106) receives the output signal from the switching circuit (105) and a k-delayed chroma signal C[n-k] of the chroma signal C[n]. Based on the received weight factor (kappa), the signal calculation circuit (106) based on the two received signals generates an output chroma signal Cout.

Figure 2:
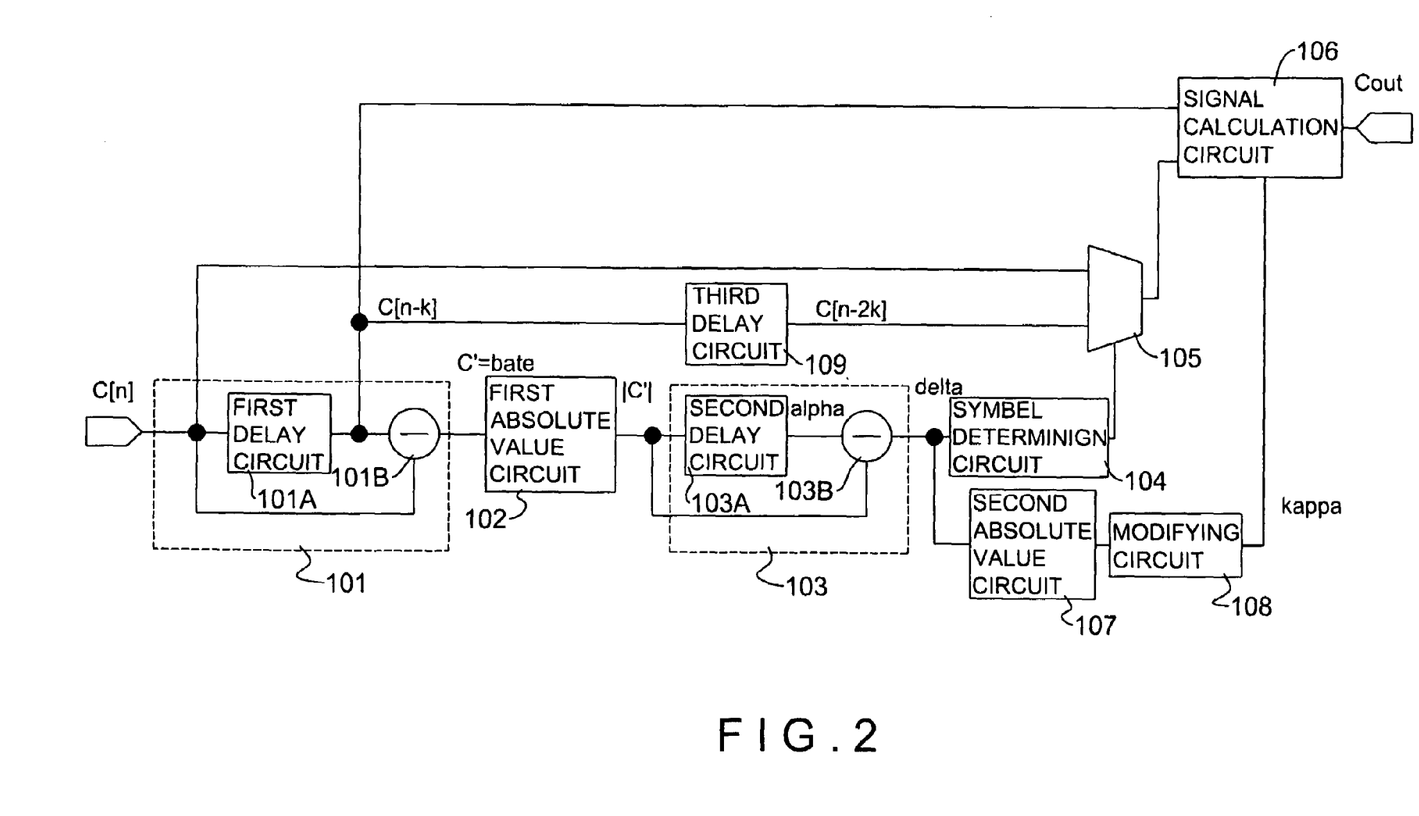
FIG. 2 is a circuit block diagram of FIG. 1 according to a first embodiment.

With reference to FIG. 2, a detailed implementation according to the first embodiment of the foregoing system is illustrated. The original chroma signal C[n] is input to the first difference circuit (101) composed of a first delay circuit (101A) and a first subtractor (101B). After the original chroma signal is delayed by k, the k-delay chroma signal C[n−k] is output from the first delay circuit (101A). The subtractor (101B) takes in the k-delayed chroma signal C[n−k] and the original chroma signal C[n], and then generates therefrom the difference signal C' of the first order. The first absolute value circuit (102) calculates the absolute value |C'| of the difference signal C'.

The second difference circuit (103) comprises a second delay circuit (103A) and a second subtractor (103B). The absolute value signal |C'| is input to the second delay circuit (103A) thus deriving a delayed absolute value signal (Alpha). The second subtractor (103B) receives the absolute value |C'| and the delayed the absolute value (Alpah), and then generates therefrom the difference signal (Delta) of second order.

The symbol determining circuit (104) then determines that the difference signal Delta is either a positive signal or a negative signal. The determined result is employed as a selecting signal applied to the switching circuit (105).

The k-delayed chroma signal C[n−k] is also input to a third delay circuit (109) thereby obtaining a 2k-delay chroma signal C[n−2k]. The k-delayed chroma signal C[n−k] and the 2k-delay chroma signal C[n−2k] are simultaneously input to the switching circuit (105) composed of a multiplexer. Based on the selecting signal provided by the symbol determining circuit (104), the multiplexer selects either the k-delayed chroma signal C[n] or the 2k-delayed chroma signal C[n−2k] as an output signal. For example, in the case that the selecting signal is a negative signal, the multiplexer chooses the 2k-delayed chroma signal C[n−2k] as the output signal. On the contrary, if the selecting signal is a positive signal, the multiplexer chooses the chroma signal C[n] as the output signal. The output signal from the multiplexer and the k-delayed chroma signal C[n−k] are then input to the signal calculation circuit (106), and generate therefrom an optimized chroma signal Cout.

Figure 3:
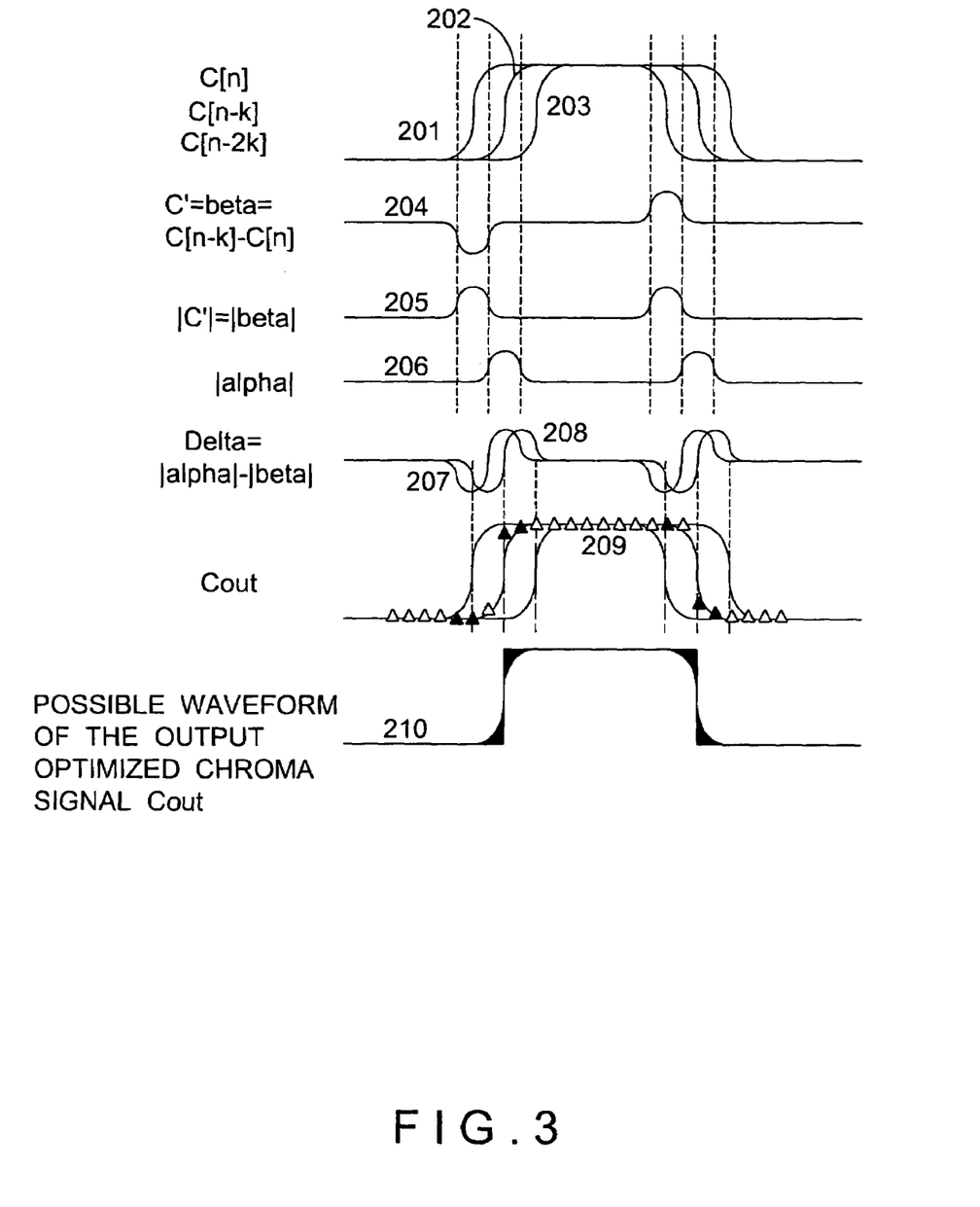
FIG. 3 illustrates waveforms of FIG. 2 in accordance with the present invention.

With reference to FIG. 3, the original input chroma signal C[n] is numbered as (201), the k-delayed chroma signal C[n−k] is numbered as (202) and the 2k-delayed chroma signal C[n−2k] is numbered as (203). The difference signal of the first order, beta, between the k-delayed chroma signal C[n−k] and the original input chroma signal C[n] is numbered as (204), wherein the absolute value of beta signal is denoted with (205). The delayed absolute value of beta signal, i.e. the |alpha| signal is denoted with (206). By subtracting the |beta| from the |alpha|, the Delta signal (207) is obtained. The Delta signal (207) can be further modified to become the signal "kappa" (208). The possible waveform of the output optimized chroma signal Cout is shown as waveform of (210).

Figure 4:
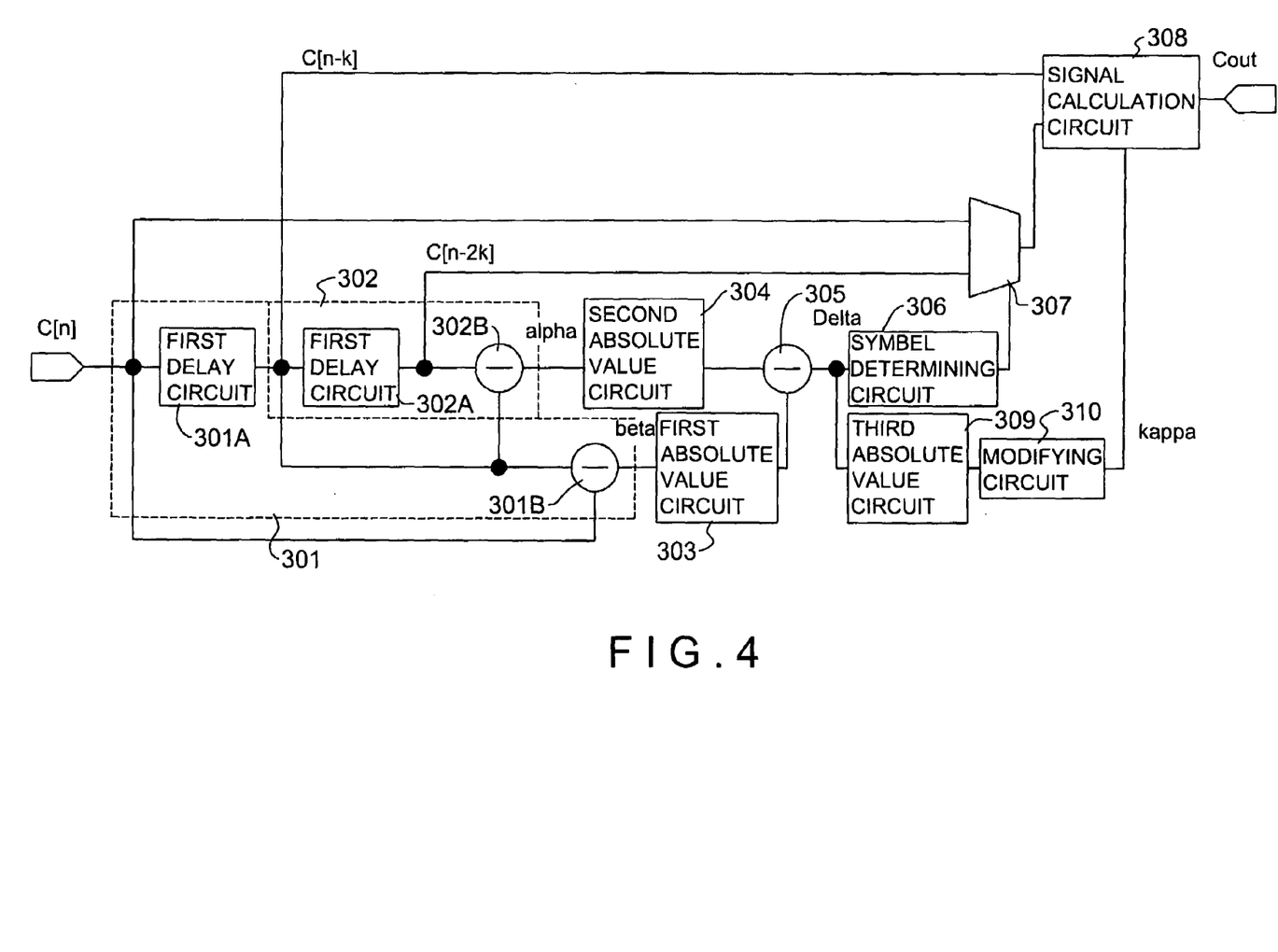
FIG. 4 is a circuit block diagram of FIG. 1 according to a second embodiment.
Figure 5:
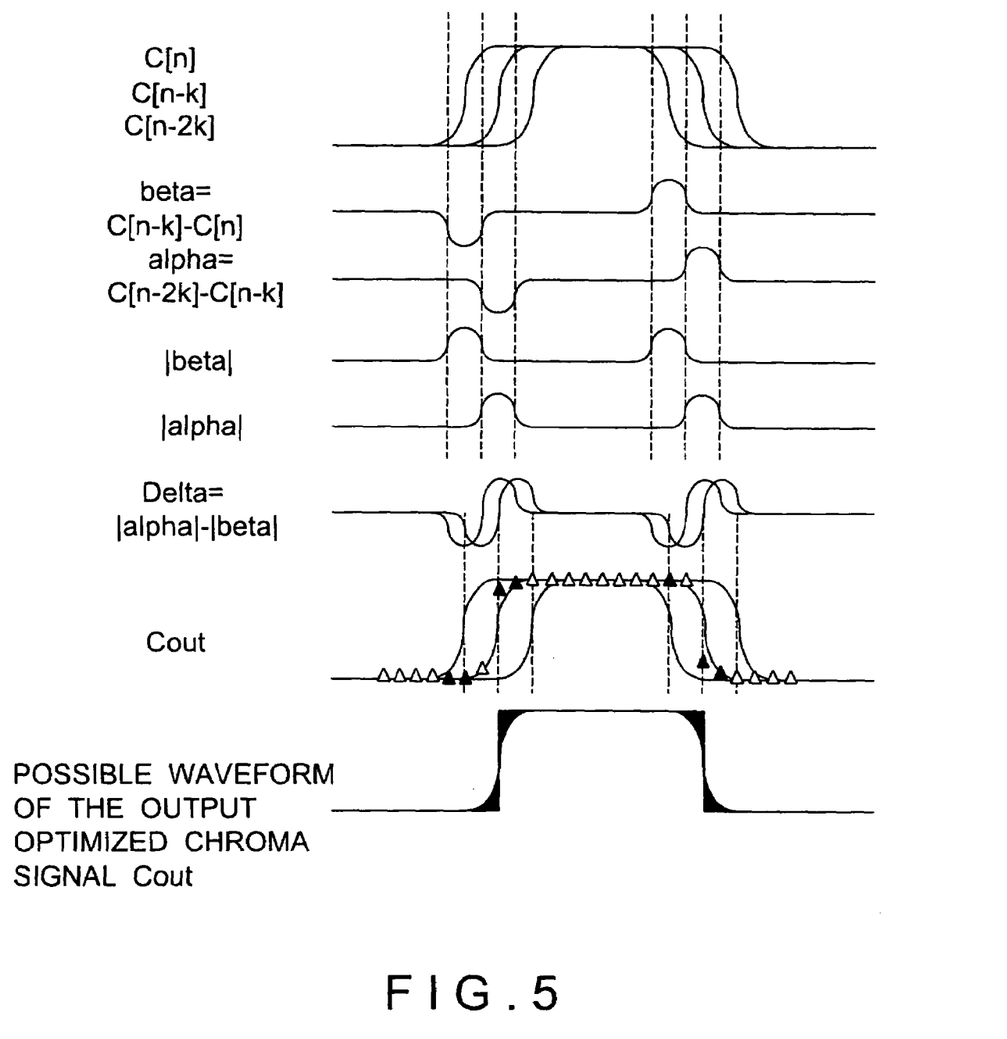
FIG. 5 illustrates waveforms of FIG. 4 in accordance with the present invention.

With reference to FIGS. 4 and 5, another embodiment of the system comprises a first difference circuit (301), a second difference circuit (302), a first absolute value circuit (303), a second absolute value circuit (304), a subtractor (305), a symbol determining circuit (306), a switching circuit (307), a signal calculation circuit (308), a third absolute value circuit (309) and a modifying circuit (310).

The first difference circuit (301) is composed of a delay circuit (301A) and a subtractor (301B), wherein the subtractor (301B) calculates a difference signal "beta" between the original input chroma signal C[n] and the k-delayed chroma signal C[n−k], wherein the absolute value of the difference signal "beta" is calculated by the first absolute value circuit (303).

The second difference circuit (302) comprises a delay circuit (302) and a subtractor (302B), wherein the subtractor (302B) calculates a difference signal "alpha" between the k-delayed chroma signal C[n-k] and the 2k-delayed chroma signal C[n-2k], wherein the absolute value of the difference signal "alpha" is obtained by the second absolute value circuit (304).

The subtractor (305) receives the two absolute values of beta and alpha signals and calculates a difference signal "Delta" between them. The symbol determining circuit (306) determines that the Delta signal is a positive signal or a negative signal.

The switching circuit (307), composed of a multiplexer, receives the original input chroma signal C[n] and the 2k-delayed chroma signal C[n-2k] and selectively outputs one of the two signals based on the determined result of the symbol determining circuit (306).

The signal calculation circuit (308) receives the output signal from the multiplexer and the k-delayed chroma signal C[n-k], wherein the output of the signal calculation circuit (308) is the processed chroma signal Cout.

The aforementioned Delta signal is further supplied to the third absolute value circuit (309) to obtain its absolute value; the acquired absolute value is then input to the modifying circuit (310) to generate a weighted signal "kappa". The weighted "kappa" signal is furnished to the signal calculation circuit (308). The output of the signal calculation circuit (308) is the optimized chroma signal Cout.

Based on the foregoing description, the system in accordance with the present invention does not need any filter. Therefore, the circuit implementation is relatively simple and inexpensive. For video signals of CCIR656 standard, which has a C channel composed of chroma signals Cb and data samples Cr alternatively arranged, the present invention also suits processing such video signals without modifying any circuit implementation.

It is to be understood, however, that even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A digital signal processing system applied for chroma transition, the system comprising:
   a first difference circuit, which receives an original chroma signal and generates a first difference signal of the original chroma signal;
   a first absolute value circuit coupled to the first difference circuit to calculate an absolute value of the first difference signal;
   a second difference circuit, which generates a second difference signal based on the reception of the absolute value from the first absolute value circuit;
   a symbol determining circuit, which determines that the second difference signal is either a positive signal or a negative signal, wherein a determined result is used as a selecting signal;
   a switching circuit, which receives the original chroma signal and a 2k-delayed chroma signal of the original chroma signal, wherein the switching circuit selectively outputs either the original chroma signal or the 2k-delayed chroma signal based on the selecting signal; and
   a signal calculation circuit, which receives an output signal of the switching circuit and a k-delayed chroma signal of the original chroma signal, and then generates therefrom an optimized chroma signal.

2. The system as claimed in claim 1, the system further comprising:
   a second absolute value circuit coupled to the second difference circuit to calculate an absolute value of the second difference signal;
   a modifying circuit coupled between the second absolute value circuit and the signal calculation circuit to adjust the absolute value of the second difference signal.

3. The system as claimed in claim 2, wherein both the first difference circuit and the second difference circuit are composed of a delay circuit and a subtractor.

4. The system as claimed in claim 3, wherein the switching circuit is composed of a multiplexer.

5. The system as claimed in claim 2, wherein the switching circuit is composed of a multiplexer.

6. A digital signal processing system applied for chroma transition, the system comprising:
   a first difference circuit, which calculates a first difference signal between an original input chroma signal C[n] and a k-delayed chroma signal C[n-k] of the original input chroma signal;
   a second difference circuit, which calculates a second difference signal between the k-delayed chroma signal C[n] and a 2k-delayed chroma signal C[n-2k];
   a first absolute value circuit coupled to the first difference circuit to calculate a first absolute value of the first difference signal;
   a second absolute value circuit coupled to the second difference circuit to calculate a second absolute value of the second difference signal;
   a subtractor, which receives the first and the second absolute values and calculates a third difference signal between them;
   a symbol determining circuit, which determines that the third difference signal is either a positive value or a negative value, wherein a determined result is used as a selecting signal;
   a switching circuit, which receives the original chroma signal C[n] and the 2k-delayed chroma signal C[n-2k] of the original chroma signal C[n], wherein the switching circuit selectively outputs either the original chroma signal C[n] or the 2k-delayed chroma signal C[n-2k] based on the selecting signal; and
   a signal calculation circuit, which receives an output signal of the switching circuit and the k-delayed chroma signal C[n-k] of the original chroma signal, wherein an output signal of the signal calculation circuit is a processed chroma signal.

7. The system as claimed in claim 6, the system further comprising:
   a third absolute value circuit coupled to the subtracter to calculate an absolute value of the third difference signal; and
   a modifying circuit coupled between the third absolute value circuit and the signal calculation circuit to supply a weight factor to the signal calculation circuit.

8. The system as claimed in claim 7, wherein both the first difference circuit and the second difference circuit are composed of a delay circuit and a subtractor.

9. The system as claimed in claim 8, wherein the switching circuit is composed of a multiplexer.

10. The system as claimed in claim 7, wherein the switching circuit is composed of a multiplexer.

11. A digital signal processing method applied for chroma transition, the method comprising the acts of:
- performing a difference process on the original input chroma signal C to obtain a first difference signal C';
- calculating an absolute value |C'| of the first difference signal C';
- performing a difference process on the absolute value |C'| to obtain a second difference signal Ca';
- determining either the second difference signal Ca' is a positive signal or a negative signal;
- wherein based on a determined result, an optimized chroma signal is generated by either mixing the original input chroma signal C with a k-delayed chroma signal, or mixing the k-delayed chroma signal C[n−k] with a 2k-delayed chroma signal C[n−2k], where k is a constant.

12. The method as claimed in claim 11, wherein the method further comprising the act of:
- calculating an absolute value of the second difference signal Ca' as a weight factor, wherein the weight factor is further supplied to calculate the original input chroma signal C with the k-delayed chroma signal, or supplied to mix the k-delayed chroma signal C[n−k] with the 2k-delayed chroma signal C[n−2k].

13. The method as claimed in claim 11, wherein the first difference signal C' is obtained by calculating a difference signal between the original input chroma signal C and the k-delayed chroma signal.

14. The method as claimed in claim 11, wherein the second difference signal Ca' is obtained by calculating a difference signal between the k-delayed chroma signal and the 2k-delayed chroma signal.

\* \* \* \* \*